United States Patent [19]

Hake

[11] Patent Number: 5,040,616
[45] Date of Patent: Aug. 20, 1991

[54] SHANK ATTACHMENT

[75] Inventor: Kenneth A. Hake, Tipton, Kans.

[73] Assignee: Kent Manufacturing Co., Inc., Tipton, Kans.

[21] Appl. No.: 611,535

[22] Filed: Nov. 13, 1990

[51] Int. Cl.$^5$ .............................................. A01B 61/04
[52] U.S. Cl. .................... 172/271; 172/763; 172/773
[58] Field of Search ............... 172/763, 681, 683, 713, 172/271, 753, 773, 762, 245, 253; 403/93, 99, 103, 161

[56] References Cited

U.S. PATENT DOCUMENTS

| | | | |
|---|---|---|---|
| 456,393 | 7/1891 | Barton | 172/271 |
| 1,090,134 | 3/1974 | Laughey | 172/271 |
| 1,635,442 | 7/1927 | Sigurd | 172/271 |
| 2,430,434 | 11/1947 | Rutter . | |
| 3,756,327 | 9/1973 | Orthman . | |
| 4,057,112 | 11/1977 | Taylor | 172/271 |
| 4,197,918 | 4/1980 | Flippin . | |
| 4,262,751 | 4/1981 | Grear . | |
| 4,269,274 | 5/1981 | Robertson et al. . | |
| 4,738,316 | 4/1988 | Wood . | |
| 4,786,204 | 11/1988 | Mayeda . | |

FOREIGN PATENT DOCUMENTS

| | | | |
|---|---|---|---|
| 1359652 | 7/1974 | United Kingdom | 172/271 |
| 2033192 | 5/1980 | United Kingdom | 172/21 |
| 2125663 | 3/1984 | United Kingdom | 172/271 |

Primary Examiner—Dennis L. Taylor
Assistant Examiner—Spencer Warnick
Attorney, Agent, or Firm—Litman, McMahon & Brown

[57] ABSTRACT

A shank attachment device for holding either a deep-tilling ripper shank or a leveling finishing tool includes two vertical plates fixedly attached to a tool bar and adapted to sandwich a ground-working tool therebetween. A ripper shank holding assembly includes a first transverse bar fixedly attached to each of the plates, a detachable taper pin and detachable shear bolt.

A ripper shank has a notch adapted to receive the transverse bar and the taper pin and shear bolt abut a rear surface of the ripper shank when the ripper shank is mounted between the two vertical plates. A finishing tool holding assembly includes a second transverse bar fixedly attached to each of the plates and a second detachable shear bolt. A finishing tool has a notch adapted to receive the second transverse bar with the second shear bolt extending through an aperture in the finishing tool when the finishing tool is mounted between the two vertical plates.

12 Claims, 2 Drawing Sheets

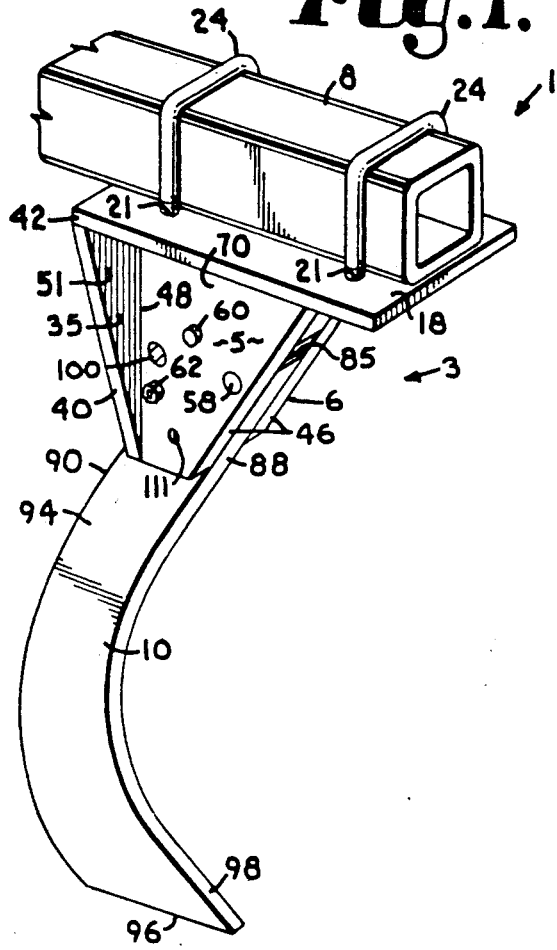
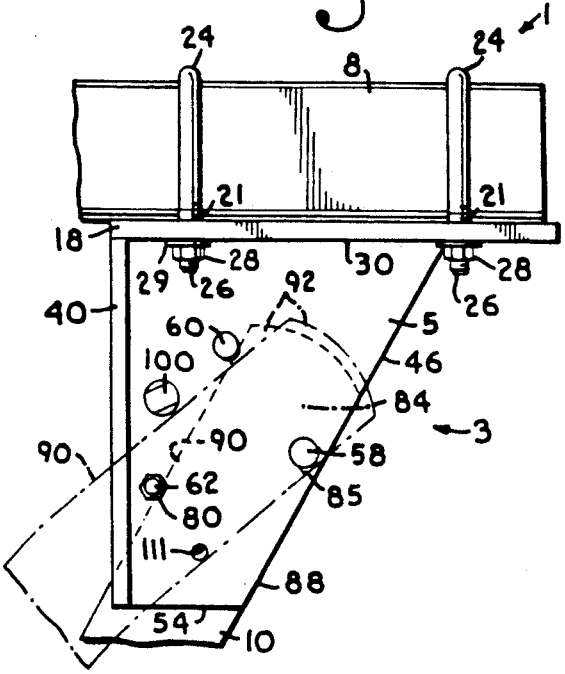
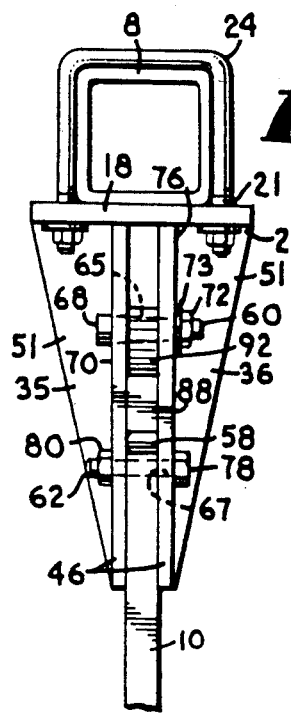
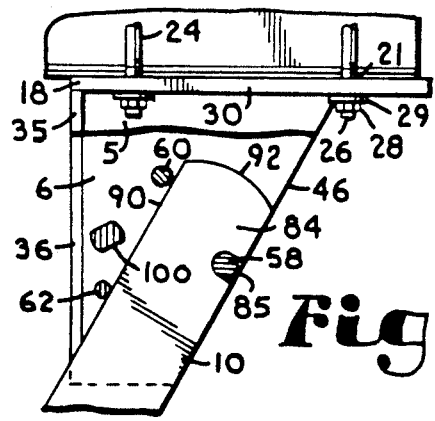
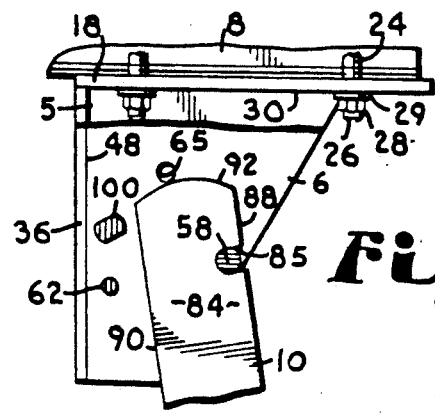

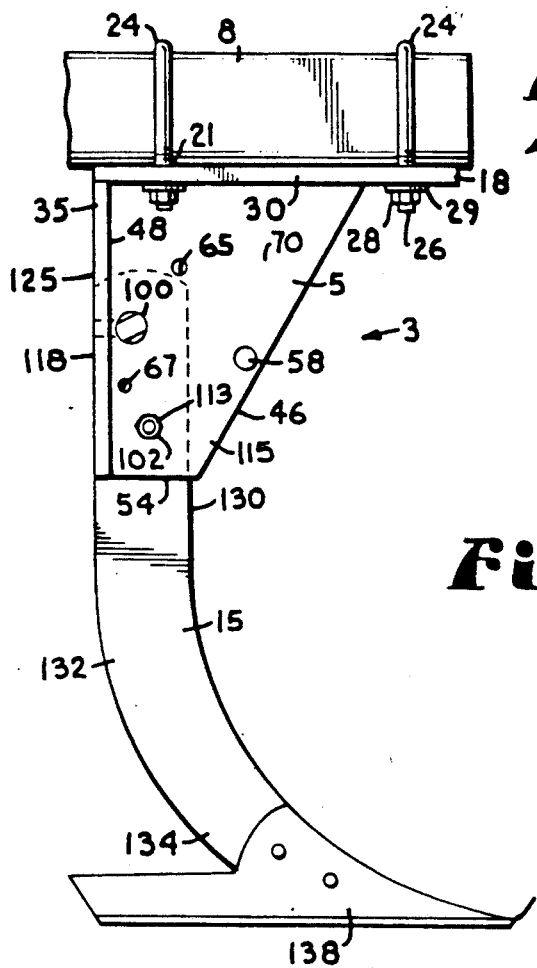
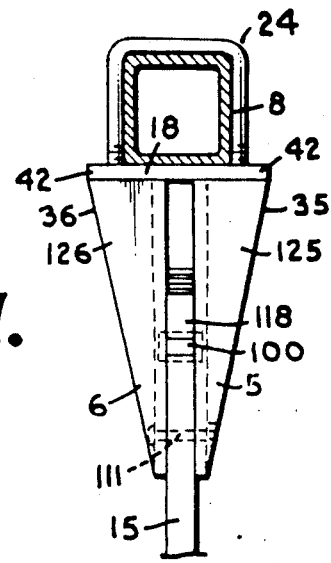
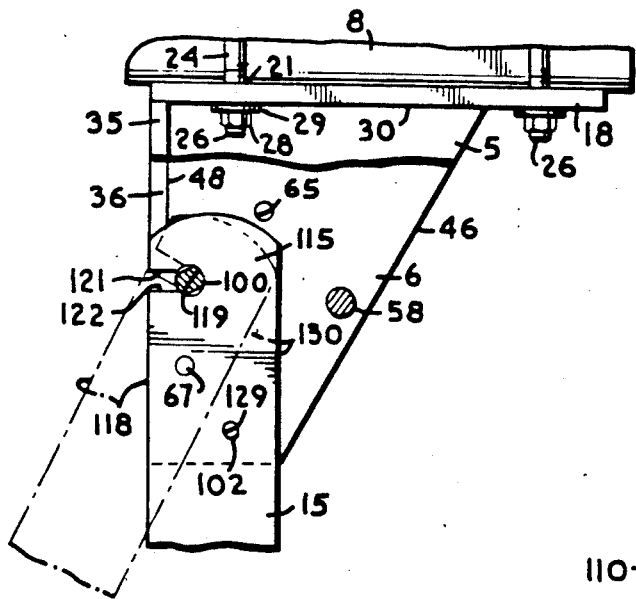
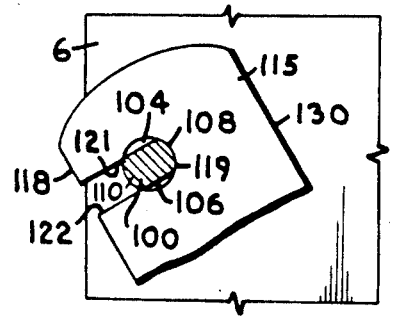
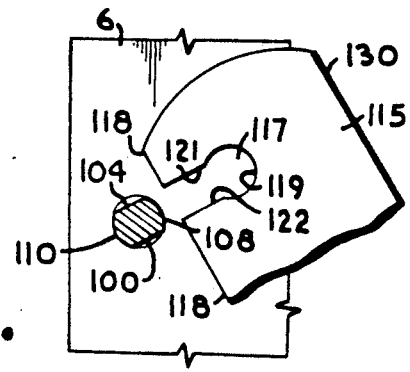

SHANK ATTACHMENT

BACKGROUND OF THE INVENTION

The present invention relates to agricultural cultivating tools and, more particularly, to a shank attachment device adaptable for holding either a ripper shank or a finishing tool.

Shank attachment assemblies are available for a variety of single purpose, ground-working tools. One type of ground-working tool that is occasionally utilized for deep tillage of the soil is a ripper shank. Because a ripper shank digs deeply into the soil, several problems arise when such a shank is used. The deep furrowing ripper shank encounters much resistance and must, therefore, be securely mounted to a tool bar. Also, a ripper shank's deep location in the soil increases the likelihood that it will come in contact with a sizable rock, root or other obstruction. Therefore, an attachment for mounting the ripper shank to the tool bar should securely attach the ripper shank thereto but also include a device for allowing the shank to deflect when contacting obstacles in the soil so that the shank does not bend or break. Furthermore, because a ripper shank forms a deep furrow in the soil, ground cultivated with an implement equipped with ripper shanks is often too uneven for immediate crop planting. Therefore, a second pass must be made over the ground with finishing tools to level the ground surface.

Several types of ripper shanks are available that dig deeply into the soil and are mounted on a tool bar by shank attachment devices. Such devices may include either a spring-type trip system or shear pins that fail when the attached shank is placed under severe stress by obstacles in its path.

However, the shank attachment devices utilized with such shanks are often complex. Although such devices may include apparatus for adjusting the depth or position of the attached ripper shank, they are not shaped or otherwise equipped to be readily adaptable for mounting and securely holding ground-working tools other than ripper shanks. Because deep tillage with ripper shanks is an occasionally performed cultivating activity, implements mounted with ripper shanks often sit idle and a second implement must be utilized to level the ground after it is worked with ripper shanks.

SUMMARY OF THE INVENTION

A shank attachment device of the invention disclosed in this application may be utilized to hold either a ripper shank or a conventional V-blade finishing tool, requiring the removal or placement of, at most, two fasteners to switch the device between a ripper shank holder and a finishing tool holder. The device includes two generally vertical, flat, horizontally-spaced parallel plates fixedly mounted to a tool bar of a farm implement. The plates are generally identical and trapezoidal in shape and adapted for sandwiching a ground-working tool therebetween. Each plate has a leading edge that slopes downwardly and rearwardly from the tool bar.

A generally transverse bar is fixedly attached to each vertical plate near the leading edges thereof and spans between the two plates for mounting of a curved ripper shank thereon. The ripper shank has a forward edge that is adapted to mount flush with the leading edges of the two plates. The forward edge of the ripper shank includes a notch that receives the transverse bar. Both plates include upper and lower apertures with the upper apertures in horizontal alignment and the lower apertures in horizontal alignment. The upper apertures are adapted for placement of a taper pin therethrough and the lower apertures are adapted for placement of a shear bolt therethrough. When the ripper shank is placed between the plates, the taper pin and shear bolt are generally in alignment and are each adjacent to a rear edge of the ripper shank. The transverse bar, taper pin and shear bolt securely hold the ripper shank in place during operation. However, if the shank hits an obstruction, the shear bolt is adapted to fail, allowing the shank to rotate rearwardly and upwardly about the transverse bar. Removal and replacement of the ripper shank requires only the removal of the taper pin.

The shank attachment device also includes a second, generally transverse bar fixedly attached to each plate near the trailing edges thereof for the mounting of a finishing tool thereon. The finishing tool includes a generally straight and vertically oriented rearward surface that includes a notch that is adapted to receive the second transverse bar. Each of the two plates and the finishing tool include a shear bolt-receiving aperture. The apertures may be horizontally aligned and a shear bolt is passed therethrough for holding the finishing tool between the plates. If a finishing tool hits an obstruction, the shear bolt is adapted to fail, and the tool moves upwardly about the obstruction rotating about the second bar. Removal and replacement of the finishing tool requires only the removal of the shear bolt.

OBJECTS AND ADVANTAGES OF THE INVENTION

Therefore, the objects of the present invention are: to provide an improved shank attachment device for mounting on a tool bar of a farm implement that is adapted to cooperate with more than one type of ground-working tool; to provide such a device that mounts simply and easily onto a tool bar; to provide such a device that includes mounts for both a ripper shank and a finishing tool; to further provide such a device that securely holds either a curved ripper shank for deeply tilling the soil or a finishing tool equipped with V-blades for leveling the ground after it has been worked with a ripper shank; to provide such a device that is shaped to provide easy mounting of both a ripper shank and a finishing tool; to further provide such a device that is trapezoidal in shape, having a sloping forward edge to provide easy positioning and mounting of a ripper shank and a generally vertical rear edge to provide easy positioning and mounting of a finishing tool; to provide such a device that includes shear bolts or pins that fail if the attached ground-working tool comes in contact with an obstruction in the soil; to provide such a device that securely holds a ground-working tool between two generally vertical, horizontally-spaced plates; to provide such a device that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a shank attachment device according to the present invention shown with a ripper shank.

FIG. 2 is a fragmentary, side elevational view of the device with portions broken away, to reveal details thereof, shown with a ripper shank.

FIG. 3 is a fragmentary, front elevational view of the device shown with a ripper shank.

FIG. 4 is an enlarged and fragmentary, side elevational view of the device shown with a ripper shank and, in phantom lines, a ripper shank in a rotated position after failure of a shear bolt.

FIG. 5 is a fragmentary, side elevational view of the device with portions broken away, to reveal details thereof, shown with a ripper shank.

FIG. 6 is a side elevational view of the device shown with a finishing tool.

FIG. 7 is a fragmentary, rear elevational view of the device shown with a finishing tool.

FIG. 8 is an enlarged and fragmentary, side elevational view of the device with portions broken away, to reveal details thereof, and showing, in phantom lines, a finishing tool in a rotated position after failure of a shear bolt.

FIG. 9 is an enlarged and fragmentary, side elevational view of the device with portions broken away, shown with a finishing tool.

FIG. 10 is an enlarged and fragmentary, side elevational view of the device with portions broken away, shown with a detached finishing tool.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in detail a shank attachment device of this invention, generally designated by the reference numeral 1, includes shank support means, illustrated generally by assembly 3 that includes a pair of generally vertical, flat, horizontally-spaced, parallel plate 5 and 6. The shank support assembly 3 is mounted to a tool bar 8 that constitutes one member of a conventional farm implement mounting frame (not shown) with device 1 adapted to hold either a ripper shank 10 or a finishing tool shank 15 between plates 5 and 6.

Plates 5 and 6 are generally identical and trapezoidal in shape and are both welded or otherwise fixedly attached to a flat plate 18 that is generally perpendicular to both plates 5 and 6 and is oriented generally horizontally when mounted adjacent to the tool bar 8. The flat plate 18 includes apertures 21 adapted to receive U-shaped brackets or U-bolts 24 that surround tool bar 8 and conform to the outer surface thereof. The U-bolts 24 include end portions 26 that extend generally vertically through apertures 21 in plate 18 and are affixed to plate 18 with nuts 28 and washers 29 that receive end portions 26 and abut against a lower surface 30 of plate 18. As shown in FIG. 1, two spaced U-bolts 24 ar utilized to attach plate 18 to tool bar 8. It is foreseen that additional U-bolts 24 or other types of brackets ma be used to attach plate 18 to tool bar 8.

Two generally flat, vertically oriented, rear support plates or flanges 35 and 36 are welded or otherwise fixedly attached to plate 18 and to plates 5 and 6 respectively, with plate 35 extending laterally from plate 5 and plate 36 extending laterally from plate 6. Plates 35 and 36 are each in the shape of a right triangle, with the edges of plate 35 that form a ninety degree angle supporting plates 18 and 5 and holding plates 18 and 5 in generally perpendicular orientation. Edges of plate 36 that form a ninety degree angle support plates 18 and 6 and hold plates 18 and 6 in generally perpendicular orientation. The edges 40 of plates 35 and 36 that form the hypotenuse or outer edge thereof extend from the outer rear corners 42 of plate 18 and taper inwardly toward plates 5 and 6 respectively.

Plates 5, 6, 18, 35 and 36 that make up the shank support assembly 3 are made from hardened metal, with plates 5 and 6 spaced to closely receive or sandwich a finishing tool therebetween. Each of plates 5 and 6 include a leading edge 46 that slopes or angles downwardly and rearwardly with respect to plate 18 and in a direction generally toward plates 35 and 36 when device 1 is mounted on tool bar 8. Each of plates 5 and 6 includes a trailing edge 48 that is generally vertical in orientation and abuts against a forward surface 51 of plates 35 and 36 respectively. Each of plates 5 and 6 also includes a bottom edge 54 that is generally horizontal in orientation.

Ripper shank positioning and holding means, illustrated by a permanent transverse bar 58, and detachable fastening means, illustrated by a detachable taper pin 60 and a detachable shear bolt 62, are all attached to device 1 when ripper shank 10 is mounted thereon. Transverse bar 58 is welded or otherwise fixedly attached to plates 5 and 6 and spans therebetween. Bar 58 is located near the leading edges 46 of plates 5 and 6 and generally centrally between plate 18 and the bottom edges 54 of plates 5 and 6.

Plates 5 and 6 each include an upper aperture 65 adapted to receive taper pin 60 and a lower aperture 67 adapted to receive shear bolt 62. Apertures 65 and 67 are spaced the same distance from edges 46 of plates 5 or 6 or, stated in another way, a line passing through the center of apertures 65 and 67 on plate 5 runs parallel to edge 46 of plate 5 and a line passing through the center of apertures 65 and 67 on plate 6 runs parallel to edge 46 of plate 6. The distance between edge 46 and aperture 65 or aperture 67 is equal to the width of a ripper shank 10. Taper pin 60 is adapted to extend generally horizontally through apertures 65 in plates 5 and 6 and span therebetween. A head portion 68 of taper pin 60 is wedged against an outer surface 70 of plate 5 and taper pin 60 is secured to device 1 by a nut 72 that receives taper pin 60 and abuts against a washer 73 that in turn abuts against an outer surface 76 of plate 6. Shear bolt 62 is adapted to extend generally horizontally through apertures 67 in plates 5 and 6 and span therebetween. A head 78 of shear bolt 62 abuts the outer surface 76 of plate 6 and bolt 62 is secured to device 1 by a nut 80 that receives bolt 62 and abuts against the outer surface 70 of plate 5.

A ripper shank 10 for mounting between plates 5 and 6 is an elongated, deep-tillage blade made from a generally flat piece of hardened metal or other strong material having a constant cross-section and includes an upper section 84 having a notch 85 located near a forward edge 88 of the ripper shank 10. The notch 85 is sized to receive bar 58. Notch 85 has sufficient depth such that when a ripper shank 10 is inserted between plates 5 and 6 and notch 85 receives bar 58, the ripper shank may be positioned with forward edge 88 of the ripper shank 10 flush with the leading edges 46 of plates 5 and 6.

Ripper shank 10 also includes a rearward edge 90 and curved top surface 92. When the upper section 84 of ripper shank 10 is properly mounted between plates 4 and 5, the forward edge 88 of the ripper shank 10 is flush with leading edges 46, the transverse bar 58 is received by notch 85 and abuts against the surface of the ripper shank 10 that bounds notch 85, and taper pin 60 and shear bolt 62 both abut against the rearward edge 90 of the ripper shank 10. The upper section 84 of the ripper shank 10 is sandwiched securely between plates 5 and 6, and shank 10 is constrained from rotation and held in a preselected vertical position by the transverse bar 58, taper pin 60 and shear bolt 62. When ripper shank 10 is mounted on device 1, a mid-section 94 of ripper shank 10 that is integral with upper section 84 extends downwardly and rearwardly from device 1 and then curves forwardly in a C-shaped curve with a base 96 located generally directly below or below and slightly forward of device 1 and having a forwardly-directed, ground-breaking, pointed portion 98, as shown in FIG. 1. The generally parabolic shape of ripper shank 10 provides strength required for deep tillage.

Removal and placement of a ripper shank only requires the removal of taper pin 60. However, if placement of a finishing tool is required, both the taper pin 60 and shear bolt 62 must be removed.

Finishing tool shank positioning and holding means, illustrated by a permanent transverse bar 100, and detachable fastening means, illustrated by a detachable shear bolt 102, are attached to device 1 when finishing tool 15 is mounted thereon. Transverse bar 100 is welded or otherwise fixedly attached to plates 5 and 6 and spans therebetween. Bar 100 is located near the trailing edges 48 of plates 5 and 6 and generally centrally between plate 18 and the bottom edges 54 of plates 5 and 6. Bar 100 includes two flat planar side surfaces or faces 104 and 106 located on opposite sides thereof and two opposite rounded surfaces 108 and 110 between side surfaces 104 and 106. Surfaces 104 and 106 are parallel and incline at an angle generally less than forty-five degrees with respect to the horizontal with rounded surface 108 located vertically higher than rounded surface 110.

Plates 5 and 6 each include an aperture 111 adapted to receive shear bolt 102. Apertures 111 are each located near bottom edges 54 of plates 5 and 6 and generally centrally between leading edges 46 and trailing edges 48. Shear bolt 102 is adapted to extend generally horizontally through apertures 111 in plates 5 and 6 and span therebetween. A head (not shown) of shear bolt 102 abuts the outer surface 76 of plate 6 and bolt 102 is secured to device 1 by a nut 113 that receives bolt 102 and abuts against the outer surface 70 of plate 5.

A finishing tool 15 for mounting between plates 5 and 6 is made from a generally flat piece of hardened metal or other strong material having a constant cross-section and includes an upper section 115 having a key-hole shaped notch 117 located near a rearward edge 118 of the finishing tool 15. The notch 117 is bounded by a circular portion 119 and two straight, parallel and generally planar side surfaces 121 and 122 that extend between rearward edge 118 and the circular portion 119. The notch 117 is sized to receive bar 100 with sides 121 and 122 adapted to closely receive faces 104 and 106. Notch 117 has sufficient depth such that when a finishing tool shank upper section 115 is inserted between plates 5 and 6, and notch 117 receives bar 100, the finishing tool may be positioned with the rearward edge 118 flush with both a rear face or surface 125 of plate 35 and a rear face or surface 126 of plate 36.

The upper shank section 115 of finishing tool 15 also includes an aperture 129 located centrally between rearward edge 118 and a forward edge 130 and adapted to align with apertures 111 in plates 5 and 6 for the placement of shear bolt 102 therethrough. When the upper shank section 115 of finishing tool 15 is properly mounted between plates 4 and 5, and the transverse bar 100 is received by notch 117 and abuts against the circular portion 119 of the finishing tool 15 that bounds notch 117, shear bolt 62 may be received by apertures 111 and aperture 129. The upper section 115 of the finishing tool 15 is thereby sandwiched securely between plates 5 and 6, and tool 15 is constrained from rotation and held in a preselected vertical position by the transverse bar 100 and shear bolt 102. Removal and placement of a finishing tool 15 only requires the removal of shear bolt 102.

When the finishing tool 15 is mounted on device 1, a mid-section 132 of finishing tool 15 that is integral with upper section 115 extends generally vertically downwardly from device 1 and then bends forwardly with a base section 134 located generally forwardly of device 1 and having a forwardly-directed pointed portion 136 and laterally-extending V-blades 138, as shown in FIG. 6.

In use, a ripper shank 10 is mounted on device 1 by inserting the upper section 84 of shank 10 near bottom edges 54 between plates 5 and 6 and sliding section 84 upwardly between bars 58 and 100. As illustrated in FIG. 5 and FIG. 2, the upper section 84 of the ripper shank 10 is then rotated slightly forwardly with notch 85 receiving bar 58 and the forward edge 88 of the shank 10 flush with leading edges 46 of plates 5 and 6. Taper pin 60 is then inserted through apertures 65 and secured to plates 5 and 6 with nut 72. Shear bolt 62 may be inserted into apertures 67 either before or after ripper shank 10 is placed between plates 5 and 6. After shear bolt 62 is inserted into apertures 67, it is secured to plates 5 and 6 with nut 80.

In operation, a farm implement (not shown) having one or more tool bars 8 equipped with a plurality of shank attachment devices 1 mounted with ripper shanks 10 is pulled through the soil with the pointed portions 98 of shanks 10 forward or first. When an obstacle is encounter by shank 10, shear bolt 62 shears and breaks into two pieces and, as illustrated by phantom lines in FIG. 4, shank 10 is free to rotate between plates 5 and 6 and about transverse bar 58. The mid-section 94 and base 96 of ripper shank 10 rotates upwardly and rearwardly and thereby passes above the obstruction with little or no damage sustained to the shank 10. Furthermore, taper pin 60 is not damaged by rotation of shank 10. To repair device 1, an operator rotates shank 10 to a position with forward edge 88 flush with leading edges 46, places a replacement shear bolt 62 into apertures 67 and secures the bolt 62 to plates 5 and 6 by a nut 80.

Both taper pin 60 and shear bolt 62 are removed from device 1 prior to mounting the finishing tool shank 15 thereon. The finishing tool 15 is mounted on device 1 by inserting the upper section 115 of shank 15 near bottom edges 54 between plates 5 and 6 and sliding section 115 upwardly between bars 58 and 100. As illustrated in FIGS. 9 and 10, the upper section 115 of the finishing tool shank 15 is then rotated slightly rearwardly and downwardly for side surfaces 121 and 122 to receive flat faces 104 and 106 respectively of transverse bar 100. The operator then slides shank 15 in a downward and rearward direction until bar 100 abuts against circular portion 119 that bounds notch 117. The upper section 115 of shank 15 is then rotated upwardly and forwardly until the rearward edge 118 of shank 15 is flush with rear faces 125 and 126 of plates 35 and 36 respectively. Faces 104 and 106 abut circular portion 119 thereby frictionally wedging bar 100 within aperture 117 and prohibiting upper section 115 from rotating in a forward direction. Shear bolt 102 is then inserted through apertures 111 of plates 5 and 6 and aperture 129 of finishing tool shank 15 and secured thereto with nut 113.

In operation, a farm implement (not shown) having one or more tool bars 8 equipped with a plurality of shank attachment devices mounted with finishing tool shanks 15 is pulled through the soil with the pointed portions 136 of shanks 15 forward or first. When an obstacle is encountered by shank 15, shear bolt 102 shears and breaks into two pieces, and as illustrated by phantom lines in FIG. 8, shank 15 is free to rotate between plates 5 and 6 and about bar 100. The mid-section 132 and base section 134 finishing tool shank 15 rotates upwardly and rearwardly and thereby passes above the obstruction with little or no damage sustained to the finishing tool 15. Furthermore, the rotation of the finishing tool 15 causes flat surface 104 of bar 100 to abut against a rear portion of circular surface of retaining notch 117 about bar 100 and frictionally prohibits the upper section 115 of shank 15 from falling downwardly and forwardly, which also protects bar 58 from damage. To repair device 1, an operator rotates shank 15 to a position with rearward edge 118 flush with surfaces 125 and 126, places a replacement shear bolt 102 into apertures 111 and 129 and secures the bolt 102 to plates 5 and 6 by a nut 113.

It is to be understood that while certain forms of the present invention have been illustrated and described herein, it is not to be limited to the specific forms or arrangement of parts described and shown.

What is claimed and desired to be secured by Letters Patent is as follows:

1. In combination, an agricultural implement having a tool bar, and a shank attachment assembly mounted on the tool bar including first and second generally vertical, parallel plates for the insertion of a ground-working tool shank therebetween, the improvement comprising:
   (a) ripper shank positioning and holding means including a first shear pin sized, shaped and positioned to cooperate with a ripper shank and being breakable under a pre-selected pressure to allow the ripper shank to swing rearwardly with respect to the parallel plates;
   (b) finishing tool shank positioning and holding means including a second shear pin, separate from the first shear pin, and sized, shaped and positioned to cooperate with a finishing tool shank and being breakable under a pre-selected pressure to allow the finishing tool to swing rearwardly with respect to the parallel plates;
   (c) both said ripper shank positioning and holding means and said finishing shank positioning and holding means mounted in association with said first and second parallel plates and cooperating to allow alternative support of the ripper shank or the finishing tool shank between said first and second parallel plates.

2. A shank attachment device for mounting on a tool bar of a farm implement; said device comprising:
   (a) shank support means fixedly mounted on the tool bar;
   (b) first shank positioning and holding means including:
      (1) a first bar fixedly attached to said shank support means; and
      (2) first detachable fastening means for mounting on said shank support means; and
   (c) second shank positioning and holding means including:
      (1) a second bar fixedly attached to said shank support means and located rearwardly from said first bar; and
      (2) second detachable fastening means for mounting on said shank support means.

3. The device according to claim 2 wherein said shank support means includes:
   (a) first and second generally vertical, flat, horizontally-spaced, parallel plates.

4. The device according to claim 2 wherein said shank support means includes:
   (a) a leading edge adapted for mounting a ripper shank flush thereto; and
   (b) a rear face adapted for mounting a finishing tool flush thereto.

5. The device according to claim 2 wherein said first detachable fastening means includes:
   (a) a taper pin attachable to said shank support means spaced from said first bar and located rearwardly therefrom; and
   (b) a first shear bolt attachable to said shank support means spaced from said first bar and generally aligned with said taper pin and located therebelow.

6. The device according to claim 2 wherein said second detachable fastening means includes:
   (a) a second shear bolt attachable to said shank support means spaced from and located generally below said second bar.

7. A shank attachment assembly for mounting on a tool bar of a farm implement; said assembly comprising:
   (a) first and second generally vertical, flat, horizontally-spaced, parallel plates fixedly attached to the tool bar; each of said first and second plates trapezoidal in shape and having a leading edge and a trailing edge; said leading edge extending in a downward and rearward direction from the tool bar; said trailing edge extending generally vertically downward from the tool bar;
   (b) first and second support flanges fixedly attached to said first and second plates respectively and located laterally and perpendicular thereto; said first flange having a first rear face and said second flange having a second rear face;
   (c) a first bar fixedly attached to said first and second plates and spanning therebetween; said first bar located near each of said leading edges of said first and second plates;

(d) a ripper shank having a first notch, a forward edge and a first rearward edge; said first notch adapted to receive said first bar; said ripper shank located between said first and second plates with said forward edge flush with said leading edges when mounted on the shank attachment assembly;

(e) a taper pin attachable to each of said first and second plates and located adjacent to said rearward edge of said ripper shank when attached to said plates;

(f) a first shear bolt attachable to each of said first and second plates and located adjacent to said rearward edge of said ripper shank when attached to said plates;

(g) a second bar fixedly attached to said first and second plates and spanning therebetween; said second bar located near said trailing edges of said first and second plates;

(h) a finishing tool having an aperture, a second rearward edge and a second notch located near said second rearward edge and adapted to receive said second bar; said finishing tool located between said first and second plates with said second rearward edge flush with said first and second rear faces when mounted on the shank attachment assembly; and (i) a second shear bolt attachable to said first and second plates and located generally below said second bar; said second shear bolt extending through said aperture in said finishing tool when said finishing tool is mounted on the shank attachment assembly.

8. In combination, an agricultural implement having a tool bar, and a shank attachment assembly mounted on the tool bar including first and second generally vertical, parallel plates for the insertion of a ground-working tool shank therebetween, the improvement comprising:

(a) ripper shank positioning and holding means; and
(b) finishing tool shank positioning and holding means;
(c) a first bar fixedly attached to the first and second plates;
(d) a taper pin attachable to said first and second plates and spaced from said first bar;
(e) a first shear bolt attachable to said first and second plates spaced from said first bar and generally aligned with said taper pin; and (f) a second bar fixedly attached to the first and second plates and spaced from said first bar; and
(g) a second shear bolt attachable to said first and second plates spaced from and located generally below said second bar.

9. The shank attachment assembly according to claim 8 including:
(a) a ripper shank having a first notch and a rearward edge; said notch adapted to receive said first bar.

10. The shank attachment assembly according to claim 9 wherein:
(a) during use of said ripper shank said rearward edge is adjacent to said taper pin and abuts against said first shear bolt until shearing of said shear bolt occurs.

11. The shank attachment assembly according to claim 8 including:
(a) a finishing tool having a second notch adapted to receive said second bar.

12. In combination, an agricultural implement having a tool bar, and a shank attachment assembly mounted on the tool bar including first and second generally vertical, parallel plates for the insertion of a ground-working tool shank therebetween, the improvement comprising:

(a) ripper shank positioning and holding means including a first shear pin sized, shaped and positioned to cooperate with a ripper shank and being breakable under a pre-selected pressure to allow the ripper shank to swing rearwardly with respect to the parallel plates;

(b) finishing tool shank positioning and holding means including a second shear pin, separate from the first shear pin, and sized, shaped and positioned to cooperate with a finishing tool shank and being breakable under a pres-selected pressure to allow the finishing tool to swing rearwardly with respect to the parallel plates;

(c) both said ripper shank positioning and holding means and said finishing shank positioning and holding means mounted in association with said first and second parallel plates and cooperating to allow alternative support of the ripper shank or the finishing tool shank between said first and second parallel plates; and (d) the first and second plates are trapezoidal in shape; each plate having a leading edge and a trailing edge; said leading edge extending in a downward and rearward direction from the tool bar; said trailing edge extending generally vertically downward from the tool bar.

* * * * *